United States Patent
Pors et al.

(10) Patent No.: US 9,316,515 B2
(45) Date of Patent: Apr. 19, 2016

(54) MAGNET MODULE FOR A NUCLEAR MAGNETIC FLOW METER

(71) Applicant: Krohne AG, Basel (CH)

(72) Inventors: Jan Teunis Aart Pors, Oud-Beijerland (NL); Jan-Willem Ramondt, Breda (NL); Johannes Antonius Spithoven, Eersel (NL)

(73) Assignee: Krohne AG, Basel (CH)

( * ) Notice: Subject to any disclaimer, the term of this patent is extended or adjusted under 35 U.S.C. 154(b) by 742 days.

(21) Appl. No.: 13/681,927

(22) Filed: Nov. 20, 2012

(65) Prior Publication Data

US 2013/0174667 A1 Jul. 11, 2013

(30) Foreign Application Priority Data

Nov. 21, 2011 (DE) .......................... 10 2011 118 923
Aug. 21, 2012 (DE) .......................... 10 2012 016 402

(51) Int. Cl.
*G01V 3/00* (2006.01)
*G01F 1/58* (2006.01)
*G01F 1/716* (2006.01)

(52) U.S. Cl.
CPC ................ *G01F 1/588* (2013.01); *G01F 1/716* (2013.01)

(58) Field of Classification Search
CPC .................................. G01F 1/588; G01F 1/716
USPC .......................................................... 324/306
See application file for complete search history.

(56) References Cited

U.S. PATENT DOCUMENTS

| | | | | |
|---|---|---|---|---|
| 4,146,479 A * | 3/1979 | Brown | ..................... | C02F 1/481 210/222 |
| 4,611,615 A * | 9/1986 | Petrovic | ............... | B01D 9/0068 123/538 |
| 4,758,813 A * | 7/1988 | Holsinger | ............ | G01R 33/383 29/599 |
| 4,782,295 A * | 11/1988 | Lew | ......................... | G01F 1/716 324/306 |
| 5,168,231 A * | 12/1992 | Aubert | ............... | G01R 33/3873 324/320 |
| 5,487,370 A * | 1/1996 | Miyazaki | ............. | F02M 27/045 123/538 |
| 5,523,732 A | 6/1996 | Leupold | | |
| 5,684,399 A * | 11/1997 | Bayer | ..................... | G01F 1/716 324/300 |
| 5,804,067 A * | 9/1998 | McDonald | .................. | B01J 8/20 210/222 |
| 6,452,390 B1 * | 9/2002 | Wollin | ..................... | G01F 1/716 324/306 |
| 6,752,923 B1 * | 6/2004 | Jans | ........................ | B01J 19/087 210/222 |
| 7,872,474 B2 * | 1/2011 | Pusiol | ....................... | G01F 1/56 324/303 |
| 7,884,605 B2 * | 2/2011 | Tamura | .............. | G01R 33/3815 324/318 |
| 8,366,927 B2 * | 2/2013 | Shofer | ................... | B01J 19/087 123/538 |
| 2008/0174309 A1 | 7/2008 | Pusiol et al. | | |
| 2010/0294706 A1 * | 11/2010 | Simonson | ............. | B03C 1/0332 210/222 |
| 2012/0209541 A1 * | 8/2012 | Ong | ......................... | G01F 1/74 702/45 |
| 2013/0176024 A1 * | 7/2013 | Pors | ......................... | G01F 1/74 324/306 |

FOREIGN PATENT DOCUMENTS

WO      2008/109126 A1     9/2008

* cited by examiner

*Primary Examiner* — Rodney Fuller
(74) *Attorney, Agent, or Firm* — Roberts Mlotkowski Safran & Cole, PC; David S. Safran

(57) ABSTRACT

A magnet module for a nuclear magnetic flow meter including at least one permanent magnet and a jacket. The jacket protects the at least one permanent magnet against peeling of magnet material by mechanical loads when the magnet module is introduced into a magnet receiver of the flow meter, simplifies introduction of the permanent magnets into the magnet receivers by reduced friction between the magnet module and the magnet receivers, and influences the magnetic field which generated by the permanent magnets.

15 Claims, 1 Drawing Sheet

MAGNET MODULE FOR A NUCLEAR MAGNETIC FLOW METER

BACKGROUND OF THE INVENTION

1. Field of the Invention

The invention relates to a magnet module for a nuclear magnetic flow meter with an arrangement which comprises at least one permanent magnet as a component.

2. Description of Related Art

Nuclear magnetic flow meters determine the flow rate of the individual phases of a multiphase fluid, the flow velocities of the individual phases, and the relative proportions of the individual phases in the multiphase fluid in a measurement tube by measuring and evaluating the voltage induced by nuclear magnetic resonance of the multiphase fluid into a suitable sensor. The measurement principle of nuclear magnetic resonance is based on the property of atomic nuclei with a free magnetic moment to precess to the nuclear spin in the presence of a magnetic field. The precession of a vector representing the magnetic moment of an atomic nucleus takes place around a vector representing the magnetic field in place of the atomic nucleus. The precession induces a voltage into the sensor. The frequency of the precession is called the Larmor frequency $\omega_L$ and is computed according to $\omega_L = \gamma \cdot B$, $\gamma$ being the gyromagnetic ratio and B being the amount of the magnetic field strength. The gyromagnetic ratio $\gamma$ is maximum for hydrogen nuclei. For this reason, fluids with hydrogen nuclei are especially suited for nuclear magnetic flow meters.

A multiphase fluid consisting essentially of crude oil, natural gas, and salt water is delivered from an oil source. So-called test separators branch off a small part of the delivered fluid, separate the individual phases of the fluid from one another, and determine the proportions of the individual phases in the fluid. Test separators, however, are expensive, cannot be installed under the sea, and do not allow real-time measurements. In particular test, separators are unable to reliably measure crude oil proportions smaller than 5%. Since the crude oil proportion of each source drops continuously and the crude oil proportion of many sources is already less than 5%, it is currently impossible to exploit these sources in an economically efficient manner.

Both crude oil and also natural gas and salt water contain hydrogen nuclei, for which, as already mentioned, the gyromagnetic ratio $\gamma$ is maximum. Nuclear magnetic flow meters are therefore suited especially for use on oil sources, and for use undersea directly on a source on the sea bed; but are not limited to these applications. Other applications arise, for example, in the petrochemical or in the chemical industry. Branching off a part of the fluid is not necessary, rather the entire fluid is measured in real time. Compared to test separators, nuclear magnetic flow meters are more economical and require less maintenance and can also especially reliably measure crude oil proportions less than 5% in the fluid, as a result of which the further exploitation of a host of oil sources becomes possible for the first time.

U.S. Pat. No. 7,872,474, discloses a magnetization device including a stack of disk magnets which forms a hollow cylindrical permanent magnet. The magnetic field is homogeneous in the cylindrical interior of the magnetization device. The disk magnets in the stack are fixed by screws of a nonmagnetic material. Each of the disk magnets includes magnet modules, wherein each of the magnet modules consists of a rectangular bar magnet. The magnet modules are introduced between two disks of a nonmagnetic material at a time in magnet receivers, which are made as form-fit depressions and fixed by screws of a nonmagnetic material.

Since a strong magnetic field is required to induce high voltages in a sensor by the precession of the hydrogen atoms contained in the fluid, strong magnet modules are used. Due to the magnet modules, which are arranged tightly to one another in space in each of the disk magnets, the interaction of the magnetic fields of the individual magnet modules causes major forces between of the magnet modules. These force actions make it very difficult to introduce the individual magnet modules. Often, with introduction under the indicated force actions, unfavorable contact of the magnet modules with the magnet receivers causes peeling of the brittle magnet material. The peeling of the magnet material changes the magnetic field of a magnet module and, thus, adversely influences the homogeneity of the resulting magnetic field in the interior of the magnetization device. Since the voltage induced by the precession of the atomic nuclei into the sensor depends on the Larmor frequency and the latter on the magnetic field strength, peeling of magnet material results in a deterioration of the measurement quality.

SUMMARY OF THE INVENTION

The primary object of this invention is to provide a magnet module whose introduction into the magnet receivers of the magnetization device of the flow meter is simplified and which especially prevents peeling of magnet material on the permanent magnets.

The magnet module according to embodiments of the invention in which the aforementioned object is achieved is implemented with a jacket that protects the permanent magnets against peeling of magnet material by mechanical loads, especially when the magnet module is introduced into the magnet receivers of the flow meter. Additionally or alternatively, the jacket simplifies the introduction of the permanent magnets into magnet receivers by reduced friction between the magnet module and the magnet receivers. Additionally or alternatively, the jacket influences the magnetic field generated by the permanent magnets.

The jacket of the magnet module, which encompasses at least one permanent magnet, can be provided at least at the contact sites between the permanent magnet and the magnet receiver. The material of the jacket prevents peeling of magnet material upon contact of the magnet module with the magnet receiver and, beforehand, in the handling of the magnet module. For example, the material can be a viscoelastic plastic, a metals, and the like, which has a low brittleness and, especially, a lower brittleness than that of the magnet material.

Unexpectedly, the introduction of the magnet module in accordance with aspects of the invention into magnet receivers is easier than the magnet module known from the prior art. In tests, the material pairing between the jacket and the magnet receivers was optimized to make their friction as low as possible. Within the framework of the tests, it was unexpectedly found that the resulting magnetic field of the magnet module in accordance with aspects of the invention can be advantageously influenced by the magnetic conductivity of the material of the jacket of the permanent magnets. For example, the jacket in the region of the poles of the permanent magnets of a material with high magnetic conductivity can act as a type of magnetic lens and form the magnetic field.

In embodiments of the magnet module in accordance with aspects of the invention, the arrangement, in addition to at least one permanent magnet as a component comprises, also includes at least one spacer as a component. All permanent magnets can have the same spatial dimensions, which reduces costs are reduced and simplifies the structure of the magnet module. Often spacers are located between permanent magnets in order to form the resulting magnetic field. The shaping of the resulting magnetic field can take place not only by the geometrical molding of the spacers, but also by the choice of the material of the spacers with respect to the permeability.

In embodiments of the magnet module in accordance with aspects of the invention, at least two of the components (i.e., the components are the permanent magnets and the spacers of an arrangement) are in contact. In implementations, the regions of the surfaces of the components, which regions are in contact, are flat surfaces. In particular, the flat surfaces of the components, which surfaces are in contact, can be congruent and, in implementations, can be additionally arranged congruently. In this way, the magnet module made is monolithic and, thus, allows a large measure of degrees of freedom in the configuration of the resulting magnetic field. In addition, the regions of the surfaces which are in contact can also be connected to one another; for example, the surfaces can be bonded. The arrangement is fixed in a mechanically durable manner and the handling is simplified by the connection.

In embodiments of the magnet module in accordance with aspects of the invention, several of the components whose flat and congruent surfaces are congruently in contact, are arranged such that a bar-shaped arrangement is formed, and the individual components are made such that outer cross sectional contours of the components, which are perpendicular to a longitudinal axis of the bar, are constant and the same along the longitudinal axis of the bar. In particular, the cross sectional contour of the bar-shaped arrangement, which is external to the longitudinal axis of the bar, can be rotationally asymmetrical with respect to the longitudinal axis of the bar and, in implementations, rectangular. The rotationally asymmetrical cross sectional contour enables a form-fit arrangement of the bar-shaped magnet module in magnet receivers of magnetization device, such that the magnet module cannot turn around the longitudinal axis of the magnet module since rotating capacity of the magnet module would adversely affect the homogeneity in the interior of the magnetization device of the magnetic field.

In embodiments of the magnet module in accordance with aspects of the invention, the jacket consists of at least one strip located on at least one of the outer surfaces of the arrangement. In particular, in a bar-shaped arrangement of the components, the strips can be located along the longitudinal axis of the bar, which minimizes the installation effort for the jacket. The outer surfaces of the arrangement result from the arrangement of the components. The strips can be, for example, plastic films or metal foils or metal sheets, which can be thicker metal foils. While the plastic films only offer protection against peeling of magnet material and enable a simple introduction of the magnet module into the magnet receiver, the metal foils or metal sheets also enable the resulting magnetic field to be influenced due to the magnetic conductivity of the selected material.

In embodiments of the magnet module in accordance with aspects of the invention, the components are fixed to one another by the strips which are arranged in a form-fit manner. The aspect of fixing the components to one another in a mechanically relatively stable manner by the strips, which are used as a jacket, arose unexpectedly during the studies on the effects of the strip material on the resulting magnetic field.

The strips, in addition to their function as protection against peeling of the magnet material and the reduction of the friction when the magnet module is introduced into one of the magnet receivers, have a third functionality. Fixing several components mechanically to one another by strips enables the permanent magnets and the spacers of an arrangement to be easily produced and the introduction of the magnet module into one of the magnet receivers in one procedure. In this way, the production effort for a magnetization device is distinctly reduced. Alternatively or additionally, at least one of the strips can be connected to at least one of the components; for example, the strips can be bonded.

Further, in embodiments of the magnet module in accordance with aspects of the invention, the jacket is a pipe into which the bar-shaped arrangement is introduced. The pipe can then located in one of the magnet receivers and can be arranged in the magnet receiver such that it can rotate and can be fixed against rotary movement. The pipe can be produced from a nonmagnetic material in order to avoid further influencing the magnetic field. The rotation capacity of the pipe in the magnet receiver makes it possible to influence the resulting magnetic field in the interior of the cylindrical permanent magnet. In implementations, an inner cross sectional contour, which is perpendicular to the longitudinal axis of the pipe, is matched to an outer cross sectional contour, which is perpendicular to the longitudinal axis of the bar, so that rotation relative to the pipe of the arrangement introduced into the pipe around the longitudinal axis of the pipe is precluded. If the magnets in the pipe and/or the pipe in the magnet receiver are not arranged free of play, the homogeneity of the magnetic field in the interior of the cylindrical permanent magnet can be adversely affected.

There are various possibilities for configuring and developing the magnet module in accordance with aspects of the invention. In this respect, reference is made to the description of various exemplary embodiments in conjunction with the drawings. The drawings show one exemplary embodiment of the magnet module according to aspects of the invention.

DETAILED DESCRIPTION OF THE INVENTION

Figure 1:
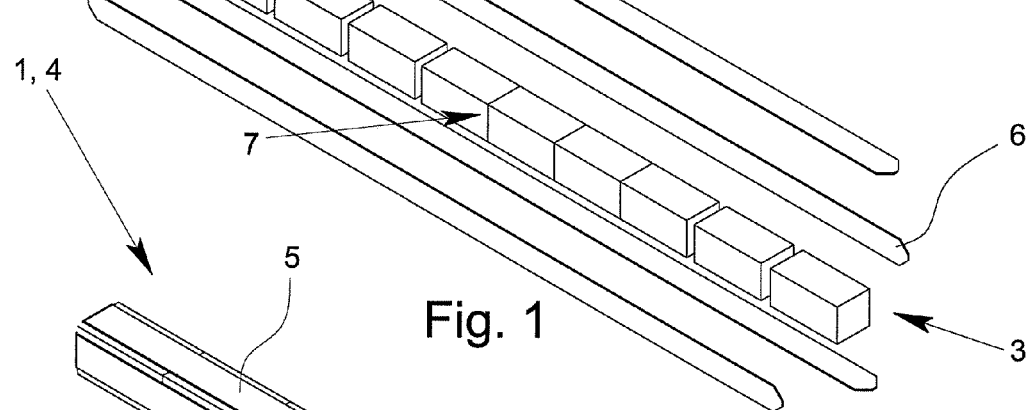
FIG. 1 is an exploded diagram showing a preferred embodiment of a magnet module in accordance with aspects of the invention.

The magnet module 1, as shown in the exploded diagram in FIG. 1, consists of ten permanent magnets 2 which form an arrangement 3, and of four elongated brass sheet metal strips which form a jacket 4. All permanent magnets 2 are made cuboidal and are arranged such that the contacting flat surfaces of the permanent magnets 2 are congruent and are arranged congruently so that a bar arrangement 3 results with the permanent magnets in contact with each other as represented for the magnets 7. Consequently, an outer cross sectional contour of the bar arrangement 3 perpendicular to the longitudinal axis of the bar is rectangular and constant along the longitudinal axis of the bar. The contacting surfaces of the permanent magnets 2 adjoin one another, but are not bonded to one another.

Figure 2:
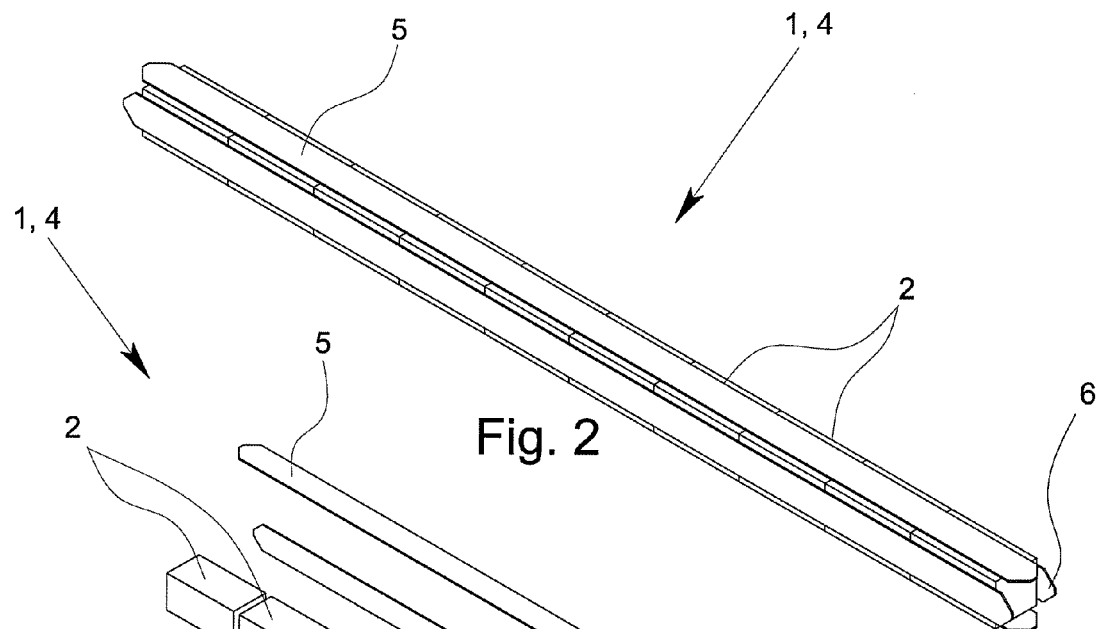
FIG. 2 shows the magnet module as shown in FIG. 1 with the clips not yet flanged and FIG. 3 shows the magnet module as shown in FIG. 1, with the clips flanged.

FIG. 2 shows an arrangement of four brass sheet metal strips 5 which form the jacket 4 on the four free surfaces of the bar arrangement 3 along the longitudinal axis of the bar. The brass sheet metal strips 5 rest positively on the surfaces, but are not connected to them. The resulting magnetic field is not influenced by the choice of brass as a material for the strips.

The brass sheet metal strips 5 are longer than the bar arrangement 3, and triangular ends of the brass sheet metal strips 5, which project over the bar arrangement 3, form clips 6.

Figure 3:
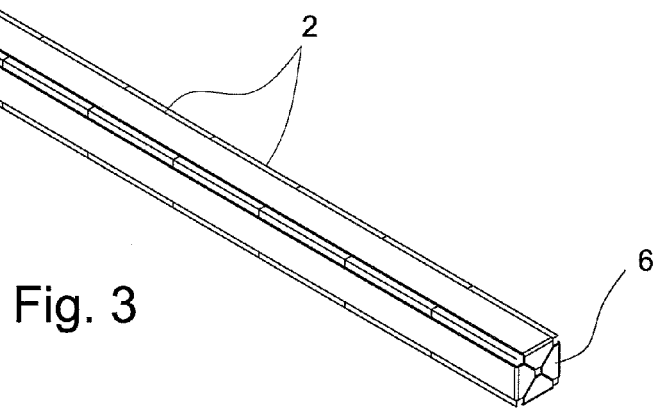

FIG. 3 shows the magnet module 1 in the state ready to install with flanged clips 6. The permanent magnets 2 of the bar arrangement 3 are fixed mechanically to one another by the positive flanging of the clips 6 on the face sides of the permanent magnets 2 on the ends of the bar arrangement 3. The length of the brass sheet metal strips 5 and the shape of the ends of the brass sheet metal strips 5 are chosen such that the flanged clips 6 do not touch one another. Due to the brass sheet metal strips 5, the cross sectional area of the magnet module 1 remains rotationally asymmetrical so that a rotation of the magnet module 1 in the magnet receivers of a magnetization device around the longitudinal axis of the magnet module 1 is inhibited.

The brass sheet metal strips 5 which are used as the jacket 4 perform three tasks. First, they protect the brittle magnetic material of the permanent magnets 2 against peeling by mechanical loads both for general handling and also during introduction into the magnet receivers. Second, they simplify the introduction, since on the one hand the friction between the brass sheet metal strips 5 and the magnet receivers is less than the friction between the magnetic material and the magnet receivers, and since on the other hand ten permanent magnets 2 can be introduced in one process instead of one permanent magnet. Third, the brass sheet metal strips 5 easily and economically fix the permanent magnets 2 of the bar arrangement 3.

What is claimed is:

1. A magnet module for a nuclear magnetic flow meter comprising:
   at least one permanent magnet; and
   a jacket,
   wherein the jacket protects the at least one permanent magnet against peeling off magnet material by mechanical loads when the magnet module is introduced into a magnet receiver of a flow meter, and
   wherein the jacket comprises at least one strip located on at least one outer surface of the at least one permanent magnet.

2. The magnet module recited in claim 1, wherein the at least one permanent magnet comprises at least two of the permanent magnets that are in contact with one another.

3. The magnet module recited in claim 2, wherein contacting regions of the surfaces of the permanent magnets are flat surfaces.

4. The magnet module recited in claim 3, wherein the flat surfaces of the permanent magnets are congruent and are arranged congruently.

5. The magnet module recited in claim 4, wherein:
   the permanent magnets are arranged such that a bar-shaped arrangement is formed; and
   the permanent magnets have outer cross sectional contours that are perpendicular to a longitudinal axis of the bar-shaped arrangement, wherein the contours are constant and are the same along the longitudinal axis of the bar-shaped arrangement.

6. The magnet module recited in claim 5, wherein the cross sectional contours of the bar-shaped arrangement, which is external to the longitudinal axis of the bar, is rotationally asymmetrical with respect to the longitudinal axis of the bar.

7. The magnet module recited in claim 6, wherein the cross-sectional contour of the bar-shaped arrangement is rectangular.

8. The magnet module recited in claim 1, wherein the at least one strip is a brass sheet.

9. The magnet module recited in claim 1, wherein the at least one strip is arranged along a longitudinal axis of a bar-shaped arrangement of the permanent magnets.

10. The magnet module recited in claim 1, wherein the permanent magnets are fixed to one another by the at least one strip.

11. The magnet module recited in claim 1, wherein at least two of the permanent magnets are connected to one another.

12. The magnet module recited in claim 11, wherein the at least two of the permanent magnets are bonded to one another.

13. The magnet module recited in claim 1, wherein the permanent magnets have the same spatial dimensions.

14. The magnet module recited in claim 1, wherein the at least one strip comprises a plurality of strips and wherein the permanent magnets are mechanically fixed to one another by the plurality of strips.

15. The magnet module recited in claim 14, wherein the mechanical fixing of permanent magnets is provided by clips formed by ends of the strips.

\* \* \* \* \*